(12) United States Patent
Breit et al.

(10) Patent No.: US 8,335,600 B2
(45) Date of Patent: Dec. 18, 2012

(54) REGENERATIVE INTEGRATED ACTUATION SYSTEM AND ASSOCIATED METHOD

(75) Inventors: Joseph S. Breit, Bellevue, WA (US); Kurt M. Lorhammer, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 1216 days.

(21) Appl. No.: 11/956,870

(22) Filed: Dec. 14, 2007

(65) Prior Publication Data

US 2009/0157234 A1 Jun. 18, 2009

(51) Int. Cl.
*G01C 23/00* (2006.01)
(52) U.S. Cl. ............................ 701/3; 244/99.2; 244/99.4
(58) Field of Classification Search ................. 244/99.2; 701/1–302
See application file for complete search history.

(56) References Cited

U.S. PATENT DOCUMENTS

| 7,237,748 | B2 | 7/2007 | Sullivan |
| 2006/0108867 | A1 | 5/2006 | Ralea |
| 2009/0045678 | A1 | 2/2009 | Recksiek et al. |

FOREIGN PATENT DOCUMENTS

| DE | 10 2005 059423 A1 | 6/2007 |
| EP | 1 099 630 A2 | 5/2001 |

OTHER PUBLICATIONS

Konstantin P. Louganski, Sep. 30, 1999, Virginia Polytechnic Institute and State University, "Modeling and Analysis of a DC Power Distribution Syste in 21$^{st}$ Century Airlifters".*
European Search Report for Application No. EP 08 25 3909 dated May 31, 2012.

* cited by examiner

*Primary Examiner* — Thomas Black
*Assistant Examiner* — Luke Huynh
(74) *Attorney, Agent, or Firm* — Alston & Bird LLP (57) ABSTRACT

A regenerative integrated actuation system and method are provided to efficiently supply power to a plurality of actuators and to make efficient use of power regenerated by the actuators. The system may include a plurality of actuators in communication with a power distribution system. Each actuator may include an energy storage element. The system may also include a controller for determining if a respective actuator is in a consumption mode or a regenerative mode. If in the consumption mode, the controller may determine whether the respective actuator should draw power from an energy storage element or from the power distribution system. Conversely, if in the regenerative mode, the controller may determine whether any excess power from the respective actuator should be provided to one of the actuators, such as to another actuator which is in the consumption mode or to the energy storage element associated with the respective actuator.

20 Claims, 3 Drawing Sheets

REGENERATIVE INTEGRATED ACTUATION SYSTEM AND ASSOCIATED METHOD

FIELD OF THE INVENTION

Embodiments of the present invention are related generally to systems and methods for power distribution and, more particularly, to systems and methods for controlling power distribution to and power regeneration by a plurality of actuators.

BACKGROUND OF THE INVENTION

Various vehicles, such as automobiles, aircraft, and maritime vessels, may include power distribution systems for generating and distributing power, often electrical, to various loads included onboard the vehicle. In the case of an aircraft, loads commonly found in the power distribution system include the flight controls, avionics, galley ovens, heaters and refrigeration units, lighting, fans, de-ice and anti-ice, etc. Typically, the power distributed to the loads by these systems is generated via an engine that is utilized both to propel the vehicle and to drive a generator. As such, the power generated by the engine must be allocated between electrical power generation and vehicle propulsion activities (and as such, the engine/propulsion mechanisms can be thought of as another load on the system, although not electrical, further dissipating energy). It is therefore desirable to design electrical power generation and distribution systems so as to distribute power efficiently between the electrical power utilization and the vehicle propulsion.

More recently, aircraft designs have increased the use of electrical power onboard an airplane. For example, recent innovations include electrical actuation (flight controls), an electrical starter-generator, which is used for engine starting and power generation, electrically powered environmental control and pressurization systems, and electrical anti-ice and de-ice systems. With the inclusion of these new loads, total electrical loading onboard an aircraft could be raised from around 100 kilowatt (kW) to around 1 megawatt (MW).

Vehicles, such as spacecraft, aircraft, missiles or the like, generally include a plurality of actuators. For example, an aircraft may include a plurality of flight control surfaces, such as along the trailing edge of a wing, and an actuator can be associated with each flight control surface in order to controllably position the flight control surface. In order to provide the motive force in order to properly position the flight control surface, an actuator may include an electrical motor. To provide the power necessary for operation of the motor, each actuator may be coupled to the power distribution system that extends through the aircraft. In instances in which the actuator is to be operative, the motor draws the necessary power from the power distribution system. In other instances, however, an actuator may be regenerative in that the actuator is able to output excess power. For example, in instances in which an actuator is moving a flight control surface to a desired position, the actuator must generally provide a braking action to stop the flight control surface at the desired position. For certain motor types, this braking action will regenerate energy by the more back electro-motive force (emf). By way of another example, in instances in which a flight control surface has been positioned out of alignment relative to the wing, such as by being lifted and therefore positioned away from the wing in order to provide localized drag, and is being moved so as to be more in alignment with the wing, such as by lowering the flight control surface, the energy transferred to the flight control surface by the airflow which pushes the flight control surface to be more in alignment with the wing may be captured by the electromagnetic forces of the motor and converted to electrical energy in the same manner as a mechanically driven actuator In this example, the actuator is essentially regenerating the initial potential energy that was used to displace the flight control surface relative to the airflow during the prior positioning of the flight control surface. In order to dissipate the regenerative power provided by an actuator, burden resistors are generally provided such that the passage of electrical current through the burden resistors will effectively dissipate the regenerative power and, in turn, will create heat. In many instances, the heat generated by the burden resistors must then be managed, e.g., rejected in a controlled manner.

As will be apparent, the dissipation of the regenerative power provided by an actuator in the form of heat is not an efficient use of the finite amount of power that an aircraft may be capable of generating during flight. This inefficiency is also manifested in terms of an increased size, rating and weight of the power distribution system necessary to deliver the requisite power, at least some of which is eventually rejected as heat. Similarly, the thermal management system must be increased in size and capacity to appropriately dissipate the heat generated in response to the regenerative power from the actuators. Additionally, the burden resistors undesirably add to the size, weight and cost of an actuator system.

Accordingly, it would be desirable to provide an improved system and method for providing power to a plurality of actuators, such as the plurality of actuators onboard an air vehicle. It would also be desirable to provide a system and method for utilizing the regenerative power provided by an actuator in a more efficient manner.

SUMMARY OF THE INVENTION

A regenerative integrated actuation system and associated method are therefore provided in accordance with certain embodiments of the present invention in order to more efficiently supply power to a plurality of actuators and to similarly make efficient use of power regenerated by the plurality of actuators. As such, the regenerative integrated actuation system and associated method of certain embodiments of the present invention may reduce the power drawn from a power distribution system, thereby conserving the potentially limited power available onboard a vehicle, such as an air vehicle. The regenerative integrated actuation system and associated method of certain embodiments may also reduce the amount of power that must be dissipated as heat, thereby also potentially reducing the requirements of an associated thermal management system.

A regenerative integrated actuation system of one embodiment includes a plurality of actuators in communication with a power distribution system. Each actuator includes an energy storage element associated therewith. The regenerative integrated actuation system of this embodiment also includes a controller for determining if a respective actuator is in a consumption mode or a regenerative mode. If the controller determines the respective actuator to be in a consumption mode, the controller is configured to determine whether the respective actuator should draw power from one of the energy storage elements or from the power distribution system. In this regard, the controller may determine whether the respective actuator should draw power from the energy storage element associated therewith, from an energy storage element associated with another actuator or from the power distribution system. Conversely, if the controller determines the respective actuator to be in a regenerative mode, the controller may be configured to determine whether any excess power from the respective actuator should be provided to one of the plurality of actuators, such as to another actuator which is in the consumption mode or to the energy storage element associated with the respective actuator for storage thereby.

In one embodiment, the regenerative integrated actuation system further includes a power trap disposed between the plurality of actuators and the power distribution system. In this embodiment, if the controller determines the respective actuator to be in a regenerative mode, the controller is further configured to determine whether any excess power from the respective actuator should be provided to the power trap. In one embodiment, the controller determines that excess power should be provided to the power trap only if no other actuator is in the consumption mode and the energy storage element associated with the respective actuator is unable to store additional power.

Additionally, if the controller determines the respective actuator to be in a consumption mode, the controller of one embodiment is further configured to determine that the respective actuator should draw power from the energy storage element associated with another actuator only if the energy storage element associated with the respective actuator is without power. While the respective actuator is determined to be in the consumption mode, the controller may additionally be configured to determine that the respective actuator should draw power from the power distribution system only if the plurality of energy storage elements are without power. As such, the regenerative integrated actuation system of this embodiment endeavors to obtain power for the respective actuator locally and in the most efficient manner prior to resorting to drawing power from the power distribution system.

On the other hand, if the controller determines the respective actuator to be in a regenerative mode, the controller of one embodiment is further configured to determine that any excess power from the respective actuator should be stored by the energy storage element associated with the respective actuator only if no other actuator is in the consumption mode. Again, the regenerative integrated actuation system of this embodiment attempts to utilize the excess power regenerated by an actuator in an efficient manner prior to storing the excess power and, even more so, before directing the excess power to a power trap.

In one embodiment, an air vehicle includes a regenerative integrated actuation system. In addition to the regenerative integrated actuation system, the air vehicle can include a vehicle body including a plurality of flight control surfaces and a power distribution system extending through at least a portion of the vehicle body. The plurality of actuators can, in turn, be associated with respective flight control surfaces. As noted above, the regenerative integrated actuation system includes a controller for directing the manner in which the plurality of actuators receive power and dispose of excess power so as to make efficient use of the potentially limited power onboard the air vehicle.

According to another aspect of the present invention, a method is provided for controlling the power consumed and regenerated by a plurality of actuators. In this regard, the method may determine if a respective one of a plurality of actuators is in a consumption mode or in a regenerative mode. If the respective actuator is determined to be in a consumption mode, the method may determine a power source, such as one of the plurality of actuators, from which the respective actuator should draw power. The power source may be chosen from among an energy storage element associated with the respective actuator, an energy storage element associated with another actuator or a power distribution system with which the plurality of actuators are in communication. Thereafter, power may be provided to the respective actuator from the chosen power source. Alternatively, if the respective actuator is determined to be in a regenerative mode, the method may determine whether any excess power from the respective actuator should be provided to one of the plurality of actuators, such as to another actuator which is in the consumption mode or to the energy storage element associated with the respective actuator for storage thereby.

In one embodiment, in instances in which the respective actuator is determined to be in a regenerative mode, the method may also determine whether any excess power from the respective actuator should be provided to a power trap disposed between the plurality of actuators and the power distribution system. In this regard, the method may determine that any excess power from the respective actuator should be provided to the power trap only if no other actuator is in the consumption mode and the energy storage element associated with the respective actuator is unable to store additional power. As such, excess power generated by a respective actuator will remain local to the plurality of actuators and used in an efficient manner, if possible, prior to directing the excess power to the power trap.

If the respective actuator is determined to be in a consumption mode, the method may determine that the respective actuator should draw power from the energy storage element associated with another actuator only if the energy storage element associated with the respective actuator is without power. In this regard, if the respective actuator is determined to be in the consumption mode, the method may also determine that the respective actuator should draw power from the power distribution system only if the plurality of energy storage elements are without power. Accordingly, the method of this embodiment endeavors to provide the actuators with power in a local and efficient manner before resorting to drawing additional power from the power distribution system.

Alternatively, if the respective actuator is determined to be in a regenerative mode, the method may also determine that any excess power from the respective actuator should be stored by the energy storage element associated with the respective actuator only if no other actuator is in the consumption mode. As such, the method of this embodiment attempts to make use of the excess in an immediate and efficient manner prior to storing the excess power and, indeed, prior to directing the excess power to a power trap for dissipation or distribution on a broader scale, either of which are generally less efficient alternatives.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
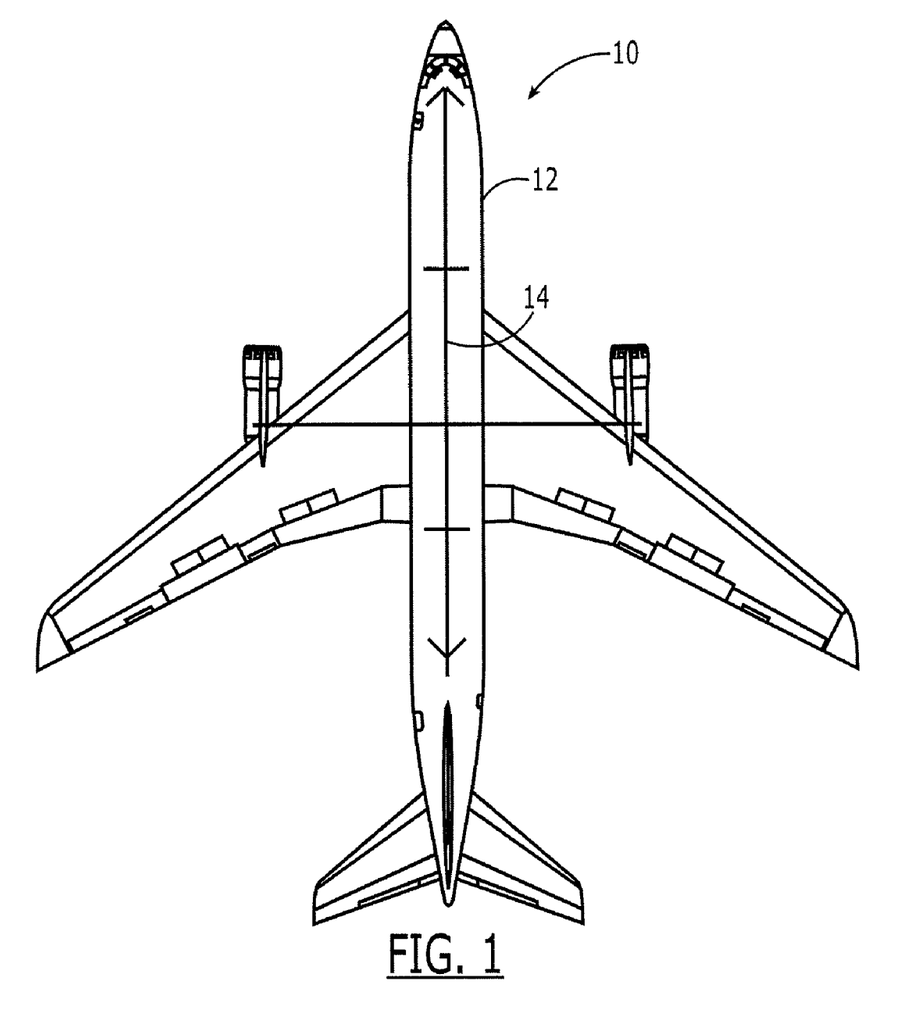
FIG. 1 is a schematic representation of an aircraft having a power distribution system extending therethrough.

Referring to FIG. 1, a vehicle and, more particularly, an aircraft 10 is depicted which may include a regenerative integrated actuation system in accordance with one embodiment of the present invention. While the regenerative integrated actuation system may be utilized in conjunction with actuators deployed in a wide variety of applications, including vehicular applications and other types of applications, the regenerative integrated actuation system of one embodiment will be described for purposes of illustration, but not of limitation, in conjunction with an air vehicle, such as a spacecraft, an aircraft, a missile or the like, and, more particularly, in conjunction with an aircraft. As shown in FIG. 1, the air vehicle includes a vehicle body 12 and a power distribution system 14 extending through at least a portion of the vehicle body for supplying electrical power to a plurality of electrical loads. The power distribution system typically includes a network, such as a network of wires or other electrical conductors extending through the vehicle body and connected to respective electrical loads. The electrical loads could be, for example, avionics, galleys, fans, etc., but will be described hereinafter in terms of actuators for controlling the position of respective flight control surfaces.

Figure 2:
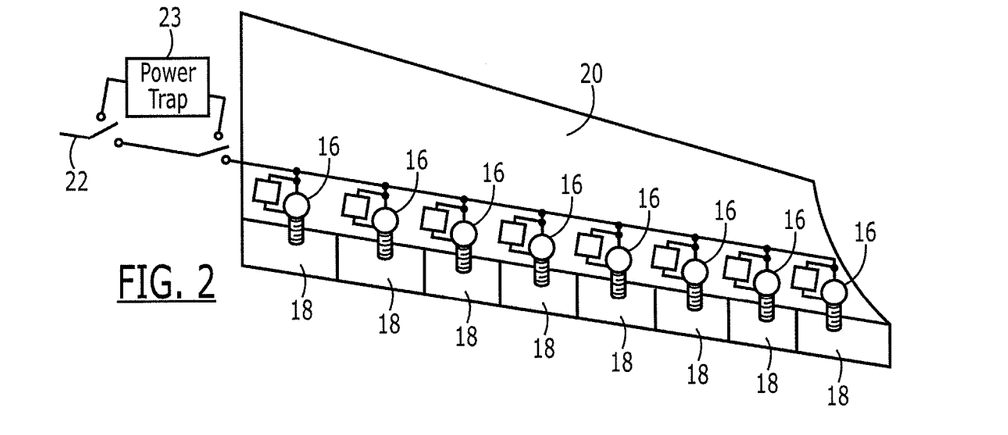
FIG. 2 is a schematic representation of one wing of an aircraft including a plurality of flight control surfaces and associated actuators which may be controlled in accordance with one embodiment to the present invention.

As shown in FIG. 2, an aircraft, such as that depicted in FIG. 1, may include a plurality of actuators 16. The actuators may provide various types of controlled movement, but in the illustrated embodiment are associated with respective flight control surfaces 18 positioned along the trailing edge of a wing 20. By way of another example, the actuators may serve to position the flight control surfaces of an impinge. As such, the actuators can be controlled to controllably position the respective flight control surfaces. As shown, the plurality of actuators may each be in communication with the power distribution system 22, such as by being an electrical connection therewith.

As shown in FIG. 2, a plurality of actuators 16 are generally segregated from and connected to the remainder of the power distribution system 22 by a power trap 23. As such, the plurality of actuators which are segregated from the remainder of the power distribution system by the power trap define a local zone or set of actuators. While the embodiment of FIG. 2 depicts each of the actuators associated with flight control surfaces 18 on a trailing edge of an aircraft wing 20 to be within a common zone. Alternatively, the zones may be differently defined with the actuators associated with the flight control surfaces along the trailing edge of an aircraft wing being grouped in two or more zones connected to the remainder of the power distribution system by respective power traps in another embodiment. Still further, the actuators associated with respect to flight control surfaces along the trailing edge of an aircraft wing may be grouped with other actuators positioned elsewhere onboard the aircraft to define a zone of actuators that is segregated from the remainder of the power distribution system by a respective power trap.

The power trap 23 may be configured in various manners and may be switchably connected to the power distribution system in certain instances in which one or more actuators of a zone are in a regenerative mode in order to receive the excess power provided by the regenerative actuator(s). In one embodiment, for example, the power trap may include one or more energy storage elements, such as one or more super capacitors, one or more batteries, one or more fuel cells or the like, which are switchably connected to the power distribution system in order to receive excess power from one or more actuators in a regenerative mode. The power received and stored by the power trap may, in turn, be controllably distributed throughout the power distribution system or may be dissipated, such as in the form of heat. By segregating the zone of actuators from the remainder of the power distribution system, however, the excess power regenerated by one or more of the actuators is prevented from being more widely disseminated across the power distribution system and, therefore, the stability and the power quality of the power distribution system are preserved.

Figure 3:
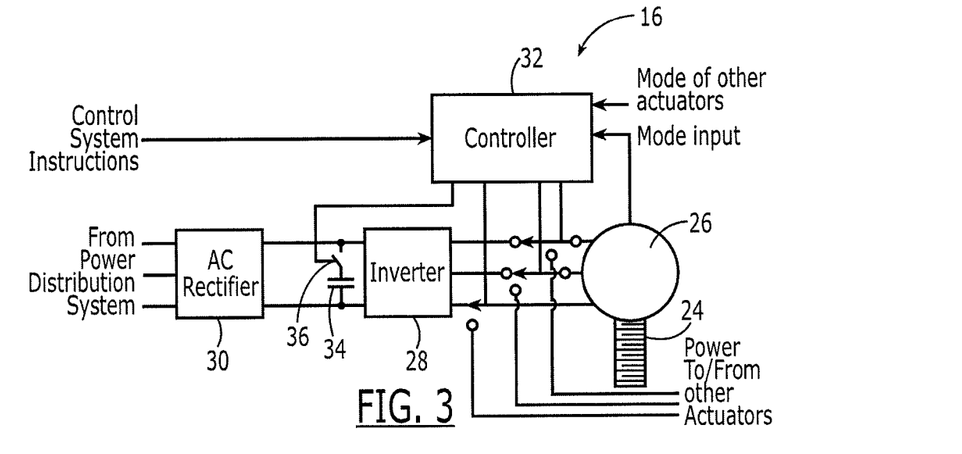
FIG. 3 is a schematic representation of an actuator including the motor, energy storage element and controller of the actuator in accordance with one embodiment to the present invention.
Figure 4:
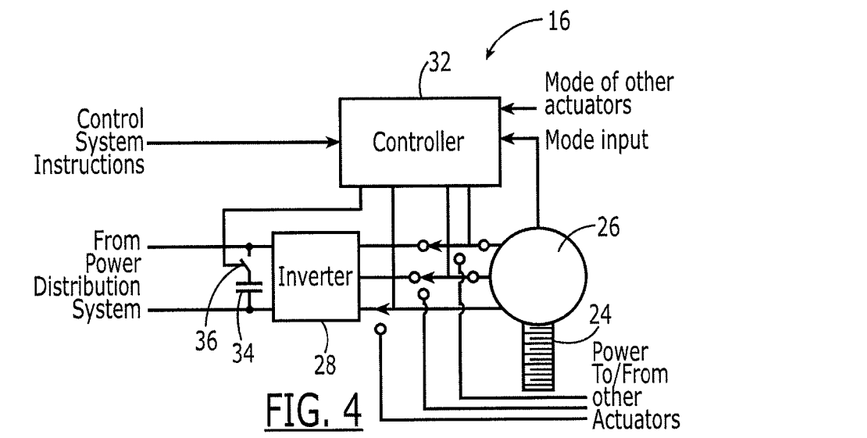
FIG. 4 is a schematic representation of an actuator including the motor, energy storage element and controller of the actuator in accordance with another embodiment to the present invention.

In order to provide individual movement of each flight control surface 18, each flight control surface is generally paired with a different respective actuator 16. However, the flight control surfaces and the actuators may be arranged in other combinations, if so desired. As shown in FIGS. 3 and 4, an actuator of one embodiment includes an actuation member 24 connected to or otherwise in communication with a respective flight control surface. The actuation member, in turn, is controllably positioned by an electrical motor 26. The electrical motor is connected to the power distribution system 22, typically via one or more inverters 28. As shown in FIG. 3, for example, the power distribution system may provide three-phase AC power. In this embodiment, the actuator may include an AC rectifier 30 to convert the three-phase AC power from the power distribution system to DC. The actuator of this embodiment may also then include an inverter 28 for converting the DC power to the AC power at the correct frequency that is required to efficiently operate the motor 26.

Alternatively, as shown in FIG. 4, the power distribution system 22 may provide DC power to the actuator 16. In this embodiment, a rectification stage is unnecessary. However, the actuator may still include an inverter 28 for converting the DC power to AC at the correct frequency for efficient operation of the motor 26.

In accordance with certain embodiments of the present invention, the actuator 16 also includes a controller 32 for controlling the power consumption of the motor 26 and for controlling the power regenerated by the actuator. In this regard, an actuator, such as an actuator associated with a flight control surface 18, either operates in a power consumption mode in which power must be provided to the motor in order to appropriately position the actuator mechanism 24 and, in turn, the flight control surface or in a regenerative mode in which the actuator serves to regenerate or provide power. As such, the controller is in communication with the motor in order to receive signals from the motor indicative of whether the actuator is in a consumption mode or regenerative mode. For example, the motor may include and be driven by a motor controller which would provide signals indicative of the motor's mode of operation. Among other functions, regarding the desired positioning of the associated flight control surface. Additionally, the controller may be in communication with the control system onboard the air vehicle for receiving instructions regarding operation of the actuator. For example, the controller may receive signals indicating that the flight control surface associated with the actuator is to be extended or retracted from which the controller may determine the mode of the actuator. The signals from the control system may also be provided to the motor, such as the motor controller, in order to advise the motor of the desired positioning of the associated flight control surface. In response to these higher level instructions, the motor controller may perform closed loop micro control of the motor to bring about the desired positioning. The controller 32 may be in communication with both the actuators to obtain real time state information and the control system to obtain the information regarding the commanded and assumed states of the actuators. Although the controller 32 and the control system are described to be distinct from one another, the controller of another embodiment may be integrated with the control system. The controller may be embodied in various manners, such as a state machine, a processor, a microcontroller, a field programmable gate array (FGPA), an application specific integrated circuit (ASIC) or any other type of computing or logic device. Moreover, each actuator can include a discrete controller. Alternatively, a common controller can be shared by two or more actuators, such as each of the local actuators within a predefined zone. In addition, an actuator 16 may also include an energy storage element 34, such as a super capacitor, a battery, a fuel cell or the like. The energy storage element may be positioned in parallel to the motor 26, such as depicted in FIGS. 3 and 4. Moreover, a power switch 36 may be associated with, such as by being in series with, the energy storage element for controlling the connection of the energy storage element to the motor. In this regard, the controller can control the power switch and thereby direct when the energy storage element is connected to the motor.

As noted above and as shown in FIG. 5, the controller 32 monitors of the state of the respective actuator 16 and, in particular, the state of the motor of the actuator to determine if the actuator is in a consumption mode in which the motor will draw power or a regenerative mode in which the motor will supply excess power. In instances in which the controller determines the actuator to be in a consumption mode, the controller then determines the power source from which the motor of the respective actuator should draw power. In this regard, the controller determines whether the motor of the respective actuator should draw power from one of the plurality of actuators. For example, the controller determines whether the motor of the respective actuator should draw power from the energy storage element 34 of the respective actuator, from another local actuator within the predefined zone that is in a regenerative mode or from the power distribution system 22. As described below, the controller selectively controls the provision of power to the motor based upon the power source(s) that are available in order to provide the power in an efficient and timely manner.

Figure 5:
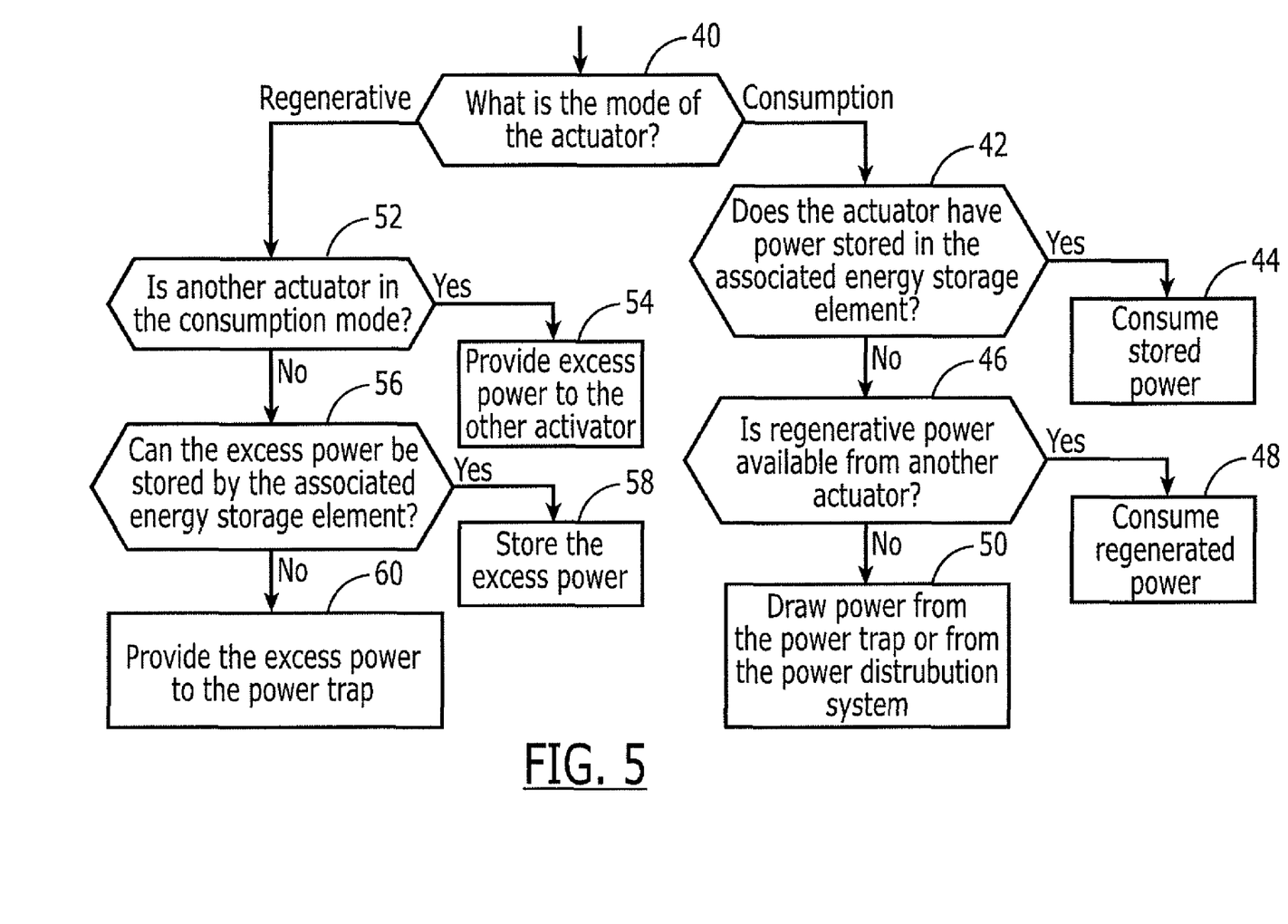
FIG. 5 is a block diagram illustrating operations performed by a controller in accordance with one embodiment to the present invention.

In this regard, the controller 32 may initially determine in block 42 if the energy storage element 34 of the respective actuator 16 has stored power and, if so, initially provides power to the motor 26 from the energy storage element of the respective actuator without consideration of the other potential power sources. By providing the power to the actuator from the local energy storage element as shown in block 44, the power may be provided in a very timely and efficient manner without the losses and delays associated with transmission of the power over a bus of any length, such as that of the power distribution system 22.

Only if the energy storage element 34 of the respective actuator 16 is without power does the controller 32 determine the availability of the other power sources. In this regard, if the energy storage element associated with the respective actuator is without power, the controller then determines in block 46 if the respective actuator should draw power from another actuator within the zone that is in a regenerative mode. In this regard, the controller is in communication with the other actuators within the zone, such as by being in communication with the controllers associated with the other actuators within the zone, so as to receive information which indicates if the other actuators within the zone are currently in a consumption mode or a regenerative mode. If one or more of the energy storage elements associated with the other actuators within the zone are currently in a regenerative mode, the controller will direct that power be provided to the respective actuator from another actuator within the zone that is in the regenerative mode. See block 48. If multiple actuators within the zone are in a regenerative mode, the controller may, but need not, direct which actuator will provide the power. For example, the controller may consider a stateflow of the flight control surfaces and, in turn, direct an actuator that is in a regenerative mode, but that will not need the regenerated power itself in the near term to provide its excess power to the respective actuator.

If the energy storage element associated with the respective actuator 16 is not currently storing power and if none of the actuators in the zone are in a regenerative mode, the controller 32 resorts to drawing power from the power distribution system 22 in a conventional manner, as shown in block 50. In instances in which the energy storage element associated with the respective actuator is not currently storing power and none of the actuators in the zone are in a regenerative mode, before drawing power from the power distribution system, the controller of one embodiment may initially determine if the power is stored by the power trap 23 and, if so, direct that the power be provided by the power trap before drawing power from the power distribution system. By endeavoring to supply the power from the other actuators within a predefined zone, however, the regenerative integrated actuation system and method of certain embodiments of the present invention may reduce the load imposed upon the power distribution system by the plurality of actuators and thereby conserve potentially limited power onboard the air vehicle. In addition, by providing the power from within a local zone of actuators, the power may be provided in a timely and an efficient manner without the delays and losses associated with transfer of the power over a longer expanse of the power distribution system.

In instances in which the controller 32 determines at block 40 that the actuator 16 and, in particular, the motor 26 of the actuator is in a regenerative mode, the controller then determines the manner in which the excess power generated by the respective actuator should be utilized. In this regard, the controller determines if the excess power should be provided to one of the plurality of actuators, such as to another actuator within the predefined zone which is in the consumption mode, to the energy storage element 34 of the respective actuator for storage thereby or to the power trap 23. Again, the controller determines the manner in which the excess power should be handled to ensure that the excess power is applied in an efficient manner.

As shown in block 52 of FIG. 5, for example, once a controller 32 has determined that an actuator 16 is in a regenerative mode, the controller determines whether another actuator within the predefined zone is in the consumption mode, such as based upon the information provided by the other actuators and, in particular, by the controllers of the other actuators within the predefined zone. If another actuator within the predefined zone is in a consumption mode, the controller will command that the excess power generated by the respective actuator be directed to the other actuator which is in the consumption mode. See block 54. In this regard, the excess power need not be stored and can, instead, be immediately utilized, thereby avoiding the inefficiencies and losses associated with power storage In instances in which two or more actuators are in a regenerative mode and another actuator is in the consumption mode, the controller may direct any one or any combination of the actuators in the regenerative mode to provide power to the actuator in the consumption mode. The controller of one embodiment may make this determination based upon a stateflow of the flight control surfaces, as described above.

If the controller 32 determines that no other actuator 16 in the zone is in the consumption mode, the controller determines if the energy storage element 34 of the respective actuator can store additional power. See block 56. If so, the controller directs the power switch 36 associated with the energy storage element of the respective actuator to a closed state such that the regenerative power produced by the motor 26 will be stored by the energy storage element. See block 58. By storing the excess power locally, the excess power can be utilized either by the respective actuator or another actuator within the predefined zone, so as to limit the load upon the power distribution system 22 and to be in a position to provide power to the actuators within a predefined zone in a timely and efficient manner as discussed above.

If, however, the energy storage element 34 of the respective actuator 16 is unable to store additional power, such as in instances in which the energy storage element has already stored a maximum amount of power, the controller 32 can communicate with the power trap 23 to advise the power trap that the excess power generated by the respective actuator will be directed to the power trap, thereby permitting the switches associated with the power trap to be closed such that the power trap can receive the excess power. The power trap can then store and/or dissipate the excess power as in block 60. In instances in which the excess power is stored, the power trap can then provide the excess power to other elements along the power distribution system in 22 a manner than reduces or eliminates any instability and/or any degradation of the power quality that may otherwise have been created by the transmission of the excess power over the power distribution system.

It is noted that the operations depicted by FIG. 5 are generally repeated on a frequent, if not continuous, basis. As such, if conditions should change, the manner in which power is consumed or the manner in which regenerative power is discharged may be altered. For example, if the controller 32 initially determines that an actuator 16 that is in a consumption mode should be provided excess power from the electrical storage element 34 associated with the respective actuator but the power available from the electrical storage element is then expended before satisfying the actuator that is in the consumption mode, the controller may direct that the remainder of the power required by the controller in the consumption mode should be provided by another power source, such as from another actuator that is in a regenerative mode or from the power distribution system 22. Alternatively, if the controller initially determines that the actuator that is in a consumption mode should be provided excess power from another actuator in a regenerative mode and if the actuator that was initially in the regenerative mode should then cease regeneration, the controller may direct that the remainder of the power required by the controller in the consumption mode should be provided by another power source, such as from the power distribution system.

As noted above, the regenerative integrated actuation system and method of certain embodiments of the present invention permit power to be provided to the actuator 16 on a localized basis, thereby decreasing the load on the power distribution system 22 and permitting the power to be provided in a timely and efficient manner. Additionally, the regenerative integrated actuation system and method of certain embodiments of the present invention permit excess power to be immediately used or stored on a local basis so as to similarly reduce the load on the power distribution system to be in a position to provide power on a timely and efficient basis. In addition, by reusing at least some of the regenerated power, the amount of excess power that must be dissipated and, correspondingly, be size and capacity requirements of the thermal management system may be correspondingly reduced.

According to one aspect of the present invention, the controller 32 which implements certain embodiments of the present invention generally operates under control of a computer program product. The controller may be embodied in many different manners. For example, a central controller can provide control logic for each actuator, each actuator within a zone or some set of actuators. Alternatively, each actuator may have a dedicated controller, i.e., a local controller, with all of the local controllers cumulatively comprising the collective network power control. Regardless of the implementation of the controller, the computer program product for performing the methods of embodiments of the present invention includes a computer-readable storage medium and computer-readable program code portions, such as a series of computer instructions, embodied in the computer-readable storage medium.

In this regard, FIG. 5 is a flowchart of method, apparatus and program products according to exemplary embodiments of the present invention. It will be understood that each block or step of the flowchart, and combinations of blocks in the flowchart, can be implemented by computer program instructions. These computer program instructions may be loaded onto a computer or other programmable apparatus, such as controller 32, to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A regenerative integrated actuation system comprising:
a plurality of actuators in communication with a power distribution system, each actuator including an energy storage element associated therewith;
a power trap disposed between the plurality of actuators and the power distribution system; and
a controller for determining if a respective actuator is in a consumption mode or a regenerative mode, wherein, if the controller determines the respective actuator to be in a consumption mode, the controller is configured to determine whether the respective actuator should draw power from one of the plurality of actuators, from the power trap or from the power distribution system, and wherein, if the controller determines the respective actuator to be in a regenerative mode, the controller is configured to determine whether any excess power from the respective actuator should be provided to one of the plurality of actuators and, in an instance in which the other actuators are not in a consumption mode, to initially determine whether the energy storage element associated with the respective actuator is able to store the excess power prior to causing the excess power to be provided to the power trap in an instance in which the energy storage element associated with the respective actuator is unable to store the excess power.

2. A regenerative integrated actuation system according to claim 1 wherein, if the controller determines the respective actuator to be in a consumption mode, the controller is further configured to determine whether the respective actuator should draw power from the energy storage element associated therewith, from another actuator that is in a regenerative mode or from the power distribution system.

3. A regenerative integrated actuation system according to claim 2, wherein, if the controller determines the respective actuator to be in a consumption mode, the controller is further configured to determine that the respective actuator should draw power from another actuator only if the energy storage element associated with the respective actuator is without power.

4. A regenerative integrated actuation system according to claim 3, wherein, if the controller determines the respective actuator to be in a consumption mode, the controller is further configured to determine that the respective actuator should draw power from the power distribution system only if the energy storage element associated with the respective actuator is without power and if no other actuator is in a regenerative mode.

5. A regenerative integrated actuation system according to claim 2, wherein, if the controller determines the respective actuator to be in a consumption mode and further if a plurality of the other actuators are in the regenerative mode, the controller is further configured to determine which of the plurality of other actuators in the regenerative mode are to supply power to the respective actuator.

6. A regenerative integrated actuation system according to claim 5 wherein the controller is configured to determine which of the plurality of other actuators in the regenerative mode are to supply power to the respective actuator based upon a stateflow of flight control surfaces associated with the plurality of actuators.

7. A regenerative integrated actuation system according to claim 1 wherein, if the controller determines the respective actuator to be in a regenerative mode and further if a plurality of the other actuators are in the consumption mode, the controller is further configured to determine which of the plurality of other actuators in the consumption mode are to receive the excess power from the respective actuator.

8. A regenerative integrated actuation system according to claim 7 wherein the controller is configured to determine which of the plurality of other actuators in the consumption mode are to receive the excess power to the respective actuator based upon a stateflow of flight control surfaces associated with the plurality of actuators.

9. An air vehicle comprising:
a vehicle body including a plurality of flight control surfaces;
a power distribution system extending through at least a portion of the vehicle body;
a plurality of actuators in communication with a power distribution system, each actuator including an energy storage element associated therewith;
a power trap disposed between the plurality of actuators and the power distribution system; and
a controller for determining if a respective actuator is in a consumption mode or a regenerative mode, wherein, if the controller determines the respective actuator to be in a consumption mode, the controller is configured to determine whether the respective actuator should draw power from one of the plurality of actuators or from the power distribution system, and wherein, if the controller determines the respective actuator to be in a regenerative mode, the controller is configured to determine whether any excess power from the respective actuator should be provided to one of the plurality of actuators and, in an instance in which the other actuators are not in a consumption mode, to initially determine whether the energy storage element associated with the respective actuator is able to store the excess power prior to causing the excess power to be provided to the power trap in an instance in which the energy storage element associated with the respective actuator is unable to store the excess power.

10. An air vehicle according to claim 9 wherein, if the controller determines the respective actuator to be in a consumption mode, the controller is further configured to determine whether the respective actuator should draw power from the energy storage element associated therewith, from another actuator that is in a regenerative mode or from the power distribution system.

11. An air vehicle according to claim 10, wherein, if the controller determines the respective actuator to be in a consumption mode, the controller is further configured to determine that the respective actuator should draw power from another actuator only if the energy storage element associated with the respective actuator is without power.

12. An air vehicle according to claim 11, wherein, if the controller determines the respective actuator to be in a consumption mode, the controller is further configured to determine that the respective actuator should draw power from the power distribution system only if the energy storage element associated with the respective actuator is without power and if no other actuator is in a regenerative mode.

13. An air vehicle according to claim 10, wherein, if the controller determines the respective actuator to be in a consumption mode and further if a plurality of the other actuators are in the regenerative mode, the controller is further configured to determine which of the plurality of other actuators in the regenerative mode are to supply power to the respective actuator.

14. An air vehicle according to claim 9 wherein, if the controller determines the respective actuator to be in a regenerative mode and further if a plurality of the other actuators are in the consumption mode, the controller is further configured to determine which of the plurality of other actuators in the consumption mode are to receive the excess power from the respective actuator.

15. A method comprising:
determining if a respective one of a plurality of actuators is in a consumption mode or a regenerative mode;
if the respective actuator is determined to be in a consumption mode, determining a power source from which the respective actuator should draw power from among the plurality of actuators or a power distribution system with which the plurality of actuators are in communication and thereafter providing power to the respective actuator from the power source;
if the respective actuator is determined to be in a regenerative mode, determining whether any excess power from the respective actuator should be provided to one of the plurality of actuators; and
in an instance in which the other actuators are not in a consumption mode, initially determining whether the energy storage element associated with the respective actuator is able to store the excess power prior to causing the excess power to be provided to a power trap disposed between the plurality of actuators and the power distribution system in an instance in which the energy storage element associated with the respective actuator is unable to store the excess power.

16. A method according to claim 15 wherein, if the respective actuator is determined to be in a consumption mode, the method further comprises determining whether the respective actuator should draw power from the energy storage element associated therewith, from another actuator that is in a regenerative mode or from the power distribution system.

17. A method according to claim 16 wherein, if the respective actuator is determined to be in a consumption mode, the method further comprises determining that the respective actuator should draw power from another actuator only if the energy storage element associated with the respective actuator is without power.

18. A method according to claim 17 wherein, if the respective actuator is determined to be in a consumption mode, the method further comprises determining that the respective actuator should draw power from the power distribution system only if the energy storage element associated with the respective actuator is without power and if no other actuator is in a regenerative mode.

19. A method according to claim 16, wherein, if the respective actuator is determined to be in a consumption mode and further if a plurality of the other actuators are in the regenerative mode, the method further comprises determining which of the plurality of other actuators in the regenerative mode are to supply power to the respective actuator.

20. A method according to claim 15 wherein, if the respective actuator is determined to be in a regenerative mode and further if a plurality of the other actuators are in the consumption mode, the method further comprises determining which of the plurality of other actuators in the consumption mode are to receive the excess power from the respective actuator.

* * * * *